US009824816B2

(12) United States Patent
Song et al.

(10) Patent No.: US 9,824,816 B2
(45) Date of Patent: Nov. 21, 2017

(54) WIRELESS POWER RECEPTION AND TRANSMISSION APPARATUS

(71) Applicants: Samsung Electronics Co., Ltd., Suwon-si (KR); Industry-University Cooperation Foundation Hanyang University, Seoul (KR)

(72) Inventors: Keum Su Song, Seoul (KR); Sang Wook Kwon, Seongnam-si (KR); Ki Young Kim, Yongin-si (KR); Dong Zo Kim, Yongin-si (KR); Bong Chul Kim, Seoul (KR); Yun Kwon Park, Dongducheon-si (KR); Jae Hyun Park, Yongin-si (KR); Chi Hyung Ahn, Suwon-si (KR); Young Ho Ryu, Yongin-si (KR); Byoung Hee Lee, Yongin-si (KR); Jun Seok Lee, Daejeon (KR); Jae Hoon Choi, Seoul (KR); Kyung Young Jung, Seoul (KR); Sang Gyu Ha, Jinju-si (KR)

(73) Assignees: Samsung Electronics Co., Ltd., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 610 days.

(21) Appl. No.: 14/230,451

(22) Filed: Mar. 31, 2014

(65) Prior Publication Data
US 2015/0061399 A1    Mar. 5, 2015

(30) Foreign Application Priority Data
Aug. 30, 2013  (KR) .................. 10-2013-0104163

(51) Int. Cl.
| H01F 27/42 | (2006.01) |
| H01F 37/00 | (2006.01) |
| H01F 38/00 | (2006.01) |
| H01F 38/14 | (2006.01) |
| H02J 5/00 | (2016.01) |

(52) U.S. Cl.
CPC .............. *H01F 38/14* (2013.01); *H02J 5/005* (2013.01)

(58) Field of Classification Search
CPC .................................. H01F 38/14; H02J 5/005
USPC ......................................................... 307/104
See application file for complete search history.

(56) References Cited

U.S. PATENT DOCUMENTS

| 2010/0065352 A1* | 3/2010 | Ichikawa .............. B60L 11/182 180/65.8 |
| 2010/0096934 A1 | 4/2010 | Joannopoulos et al. |
| 2011/0139491 A1* | 6/2011 | Chang ................ C23C 18/1651 174/254 |
| 2011/0241613 A1* | 10/2011 | Ryu ...................... H01F 27/365 320/108 |
| 2012/0032522 A1* | 2/2012 | Schatz .................... H02J 5/005 307/104 |

(Continued)

FOREIGN PATENT DOCUMENTS

WO    WO2013091875    *   6/2013

*Primary Examiner* — Richard Tan
(74) *Attorney, Agent, or Firm* — NSIP Law

(57) ABSTRACT

A wireless power receiving device and a wireless power transmission apparatus are provided. The wireless power receiver may include a resonator configured to emit an electromagnetic field, a blocker configured to surround a portion of an exterior of the resonator, and a spacer disposed between the resonator and the blocker.

18 Claims, 12 Drawing Sheets

(56) References Cited

U.S. PATENT DOCUMENTS

| | | | |
|---|---|---|---|
| 2012/0217819 A1* | 8/2012 | Yamakawa | B60L 11/182 307/104 |
| 2012/0242447 A1* | 9/2012 | Ichikawa | B60L 11/182 336/84 C |
| 2013/0009488 A1* | 1/2013 | Choe | H02J 5/005 307/104 |
| 2013/0038135 A1* | 2/2013 | Ichikawa | B60L 11/182 307/104 |
| 2014/0055089 A1* | 2/2014 | Ichikawa | H01F 38/14 320/108 |
| 2014/0111002 A1* | 4/2014 | Horiuchi | H01F 38/14 307/9.1 |

\* cited by examiner

10

10

Transmission efficiency during relaxation

Transmission efficiency during contraction

WIRELESS POWER RECEPTION AND TRANSMISSION APPARATUS

RELATED APPLICATIONS

This application claims the benefit under 35 USC 119(a) of Korean Patent Application No. 10-2013-0104163, filed on Aug. 30, 2013, in the Korean Intellectual Property Office, the entire disclosure of which is hereby incorporated by reference for all purposes.

BACKGROUND

1. Field

The following description relates to a wireless power transmission device and apparatus.

2. Description of Related Art

Wireless power refers to an energy transferred from a wireless power transmitter to a wireless power receiver through magnetic coupling. A wireless power transfer device or apparatus refer to a device or apparatus that transmits and receives the wireless power. For example, Korean Patent Application No. 10-2007-0123750 discloses a wireless power transfer system configured to charge a plurality of wireless power transfer apparatuses located within a short distance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a wireless power receiver including a resonator configured to emit an electromagnetic field, a blocker configured to surround a portion of an exterior of the resonator, and a spacer disposed between the resonator and the blocker.

The blocker may have a cross section corresponding to a cross section of the resonator, and at least one side of the blocker may be open.

The open side of the blocker may face an interior of the resonator having a loop structure.

At least a part of the blocker may be made of metal.

A change in transmission efficiency of the resonator may be minimized based on at least one of a width of the blocker extended from an outermost portion of the blocker to the resonator, a distance between the resonator and the blocker, or a capacitor disposed in the blocker.

A width of the blocker extending from an outermost portion of the blocker toward the resonator may be variable.

The blocker may include a slot for leakage of the electromagnetic field from the resonator.

The resonator may be provided in a loop shape and may include a transmission line and a capacitor.

The resonator may be provided in a helix shape and may include a transmission line and a capacitor.

A magnetic core may be configured to pass through the resonator.

The spacer may be filled with a fire retardant composition 4 (FR4).

The spacer may include a supporting medium configured to maintain a predetermined distance between the resonator and the blocker.

The supporting medium may be a screw contacting the resonator at a first one end and the blocker at a second end.

The wireless power receiver may include a holder configured to contain the wireless power receiver, wherein the blocker is separated from the holder by a predetermined distance.

In another general aspect, there is provided a wireless power receiver including a resonator having a loop structure, and a metal surface surrounding an exterior of the resonator and being disposed between the resonator and a surrounding medium, and a slot in the metal surface being configured to leak an electromagnetic field from the resonator.

A cross section of the metal surface may correspond to a cross section of the resonator, and the metal surface may be separated from the resonator by a predetermined distance.

A change in transmission efficiency of the resonator due to disturbance in a surrounding medium may be minimized based on at least one of a width of the metal surface that extends from an outermost portion of the metal surface to the resonator, a distance between the resonator and the metal surface, or a capacitor disposed in the metal surface.

The resonator may include a first conductor having a loop structure, and a second conductor disposed on a same plane as the first conductor to surround an outside of the first conductor, and a distance separating the first conductor from the second conductor.

The first conductor may include a first branch element extending from a first side of the loop structure to a second side of the loop structure.

The first conductor may include a second branch element extending from a first side of the loop structure to a second side of the loop structure.

In another general aspect, there is provided a wireless power transmission apparatus including a wireless power transmitter disposed outside a subject, and a wireless power receiver implanted in the subject, wherein the wireless power receiver includes a resonator configured to emit an electromagnetic field, and a metal surface surrounding a portion of an exterior of the resonator and being disposed between the resonator and a tissue of the subject.

The resonator may have a loop structure, and the metal surface has a cross section corresponding to a cross section of the resonator and is open on at least one side.

A change in transmission efficiency due to movement of the tissue may be minimized based on at least one of a width of the metal surface that extends from the outermost portion of the metal surface to the resonator, a distance between the resonator and the metal surface, or a capacitor disposed in the metal surface.

The wireless power transmitter may include a supporting medium configured to space the resonator and the metal surface from each other by a predetermined distance, and to contacts the resonator with a first end and the metal surface with a second end.

Other features and aspects will be apparent from the following detailed description, the drawings, and the claims.

Figure 1:
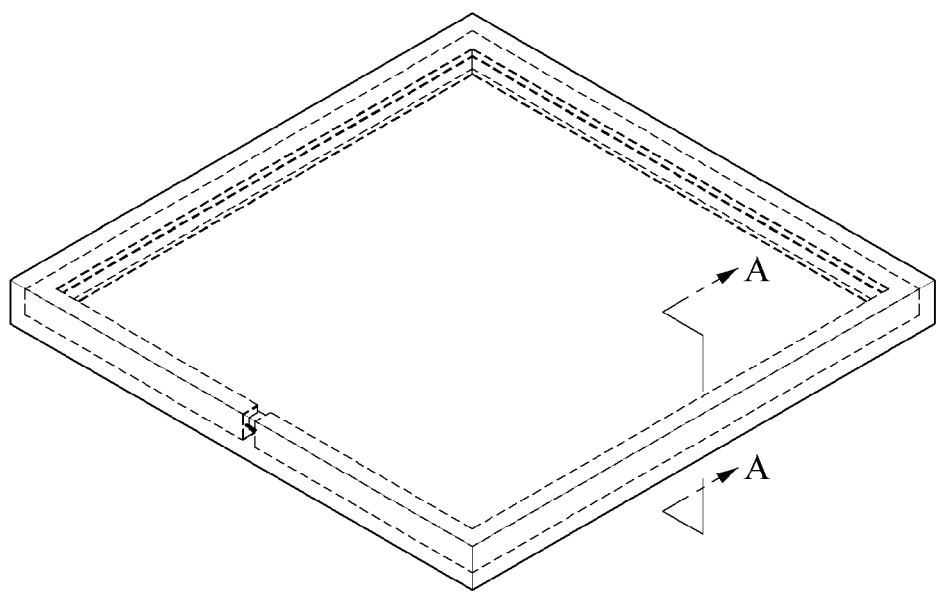
FIG. 1 is a diagram illustrating an example of a wireless power receiving device.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 2:
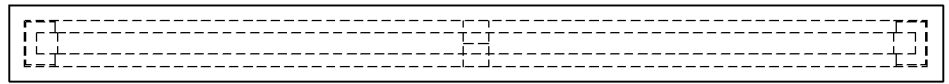
FIG. 2 is a diagram illustrating an example of a wireless power receiving device.
Figure 3A:
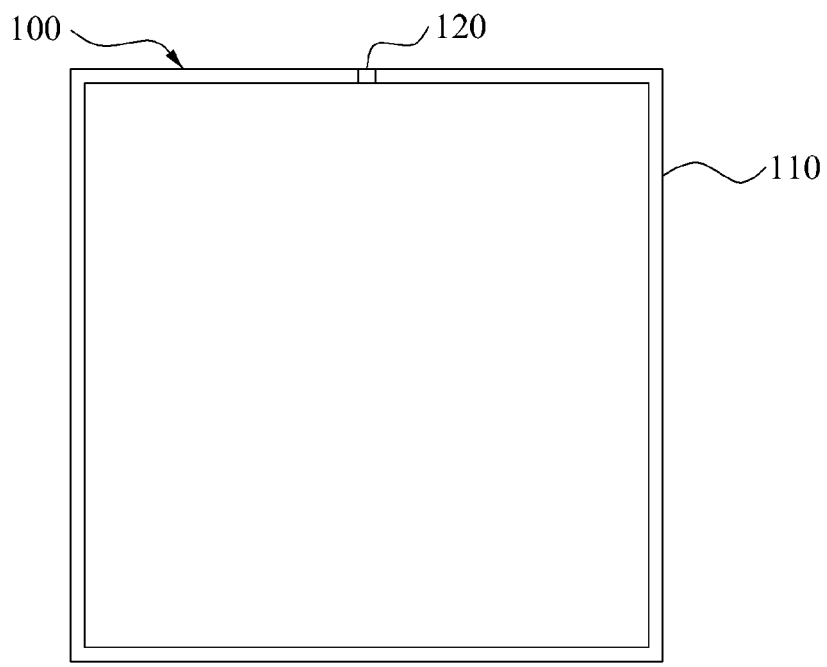
FIGS. 3A and 3B are diagrams illustrating examples of a resonator body of a wireless power receiving device.
Figure 3B:
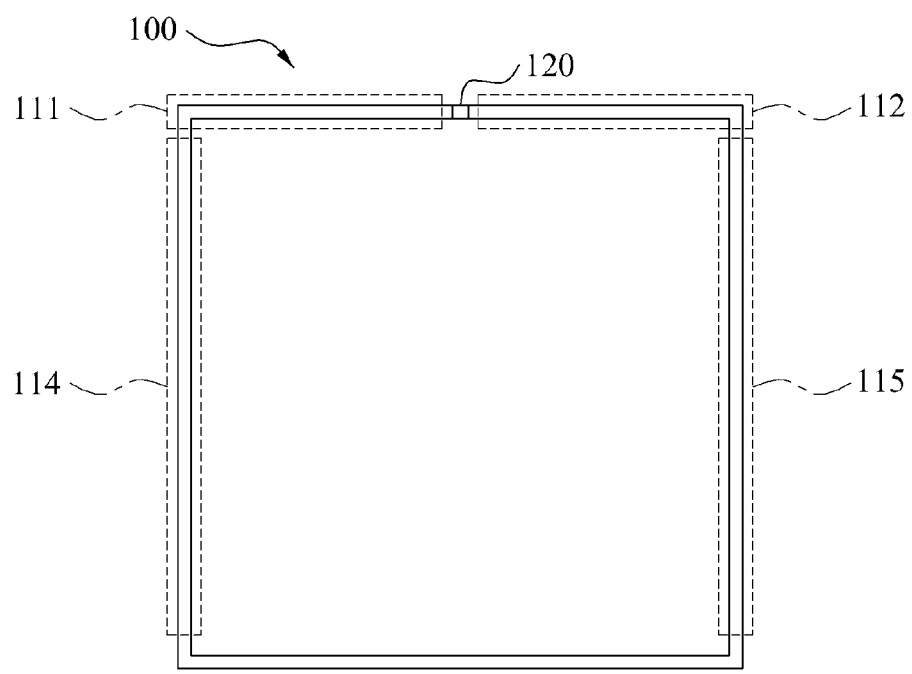
Figure 4:
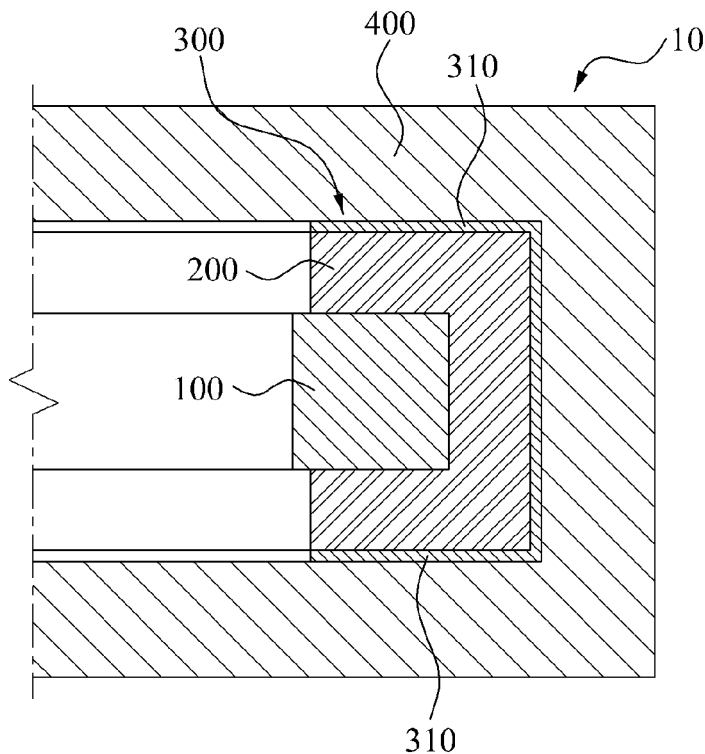
FIG. 4 is a diagram illustrating an example of the wireless power receiving device of FIG. 1, cut along line A-A.

FIG. 1 is a diagram illustrating an example of a wireless power receiving device 10. FIG. 2 is a front view illustrating the wireless power receiving device 10 of FIG. 1. FIGS. 3A and 3B are plan views illustrating a resonator body 100 of the wireless power receiving device 10 of FIG. 1. FIG. 4 is a sectional view illustrating the wireless power receiving device 10 of FIG. 1, cut along a line A-A.

Referring to FIGS. 1 to 4, the wireless power receiving device 10 includes the resonator body 100, a blocking unit 300 configured to surround at least a part of an outside of the resonator body 100, and a space unit 200 disposed between the resonator body 100 and the blocking unit 300.

Referring to FIG. 3A, the resonator body 100 may include a transmission line 110 and a capacitor 120.

The resonator body 100 may be in a loop shape. The transmission line 110 may be in the loop shape, for example a single loop shape, a multi turn loop shape, or a helix shape. In the non-exhaustive example illustrated in FIGS. 1 to 4, the single loop shape or the multi turn loop shape is rectangular. But other shapes, such as, for example circular or oval, are considered to be well within the scope of the present disclosure.

FIG. 3B shows details of FIG. 3A. Referring to FIG. 3B, the resonator body 100 includes the transmission line 110, a first conductor 114, a second conductor 115, and at least one capacitor 120.

The capacitor 120 is inserted between a first signal conductor portion 111 and a second signal conductor portion 112 in a serial or parallel manner. Accordingly, an electric field is confined to the capacitor 120.

As shown in FIG. 3B, the resonator body 100 may have a two-dimensional (2D) structure. The transmission line 110 may include the first signal conductor portion 111 and the second signal conductor portion 112 at an upper portion of the transmission line 110.

A current flows through the first signal conductor portion 111 and the second signal conductor portion 112.

The first signal conductor portion 111, the second signal conductor portion 112, and conductors 114 and 115 may be interconnected so that the resonator body 100 is configured into a closed loop structure. The 'loop structure' includes any type of polygonal structure such as, for example, a circular structure or a rectangular structure. When an element is referred to as 'having the loop structure,' the element is electrically closed.

The capacitor 120 may be inserted in a middle of the transmission line 110. The capacitor 120 may be inserted between the first signal conductor portion 111 and the second signal conductor portion 112. The capacitor 120 may be implemented in various forms, such as, for example, as a lumped element, or a distributed element. As a non-exhaustive example, the capacitor as distributed element may include conductor lines arranged in a zigzag form and dielectric substances having high permittivity, disposed between the conductor lines.

In a near field, an electric field is concentrated around the capacitor 120 inserted in the transmission line 110. Therefore, a magnetic field may dominate in the near field. A resonator may have a high Q factor using the capacitor 120 in the form of the distributed element, thereby increasing power transmission efficiency. The Q factor refers to a ratio of reactance with respect to an ohmic loss or resistance. An increase in the Q factor may increase the wireless power transmission efficiency.

Although not shown in FIG. 3B, a magnetic core passing through the resonator may be further included. The magnetic core may increase a power transmission distance.

Referring to FIG. 4, the wireless power receiving device 10 may have a single loop structure. A blocking unit 300 surrounds the outside of the resonator body 100 and the cross section of the blocking unit 300 may correspond to a cross section of the resonator body 100. For example, when the cross section of the resonator body 100 is rectangular, the cross section of the blocking unit 300 may also be rectangular. However, the cross section of the resonator body 100 and the blocking unit 300 is not limited to a rectangular shape, and other shapes are considered to be well within the scope of the present disclosure. For example, when the cross section of the resonator body 100 is circular, oval, or any polygonal shape other than the rectangular shape, the cross section of the blocking unit 300 may correspond to the shape of the resonator body 100 and may be circular, oval, or polygonal respectively.

Although the cross section of the blocking unit 300 corresponds to the cross section of the resonator body 100, one side of the cross section of the blocking unit 300 may be open. The open side of the blocking unit 300 may be directed toward an inside of the resonator body 100 having the loop shape. The open side may be in the form of a slot formed in a length direction of the blocking unit 300. The electric field may leak through the open side from the resonator body 100.

For example, referring to FIG. 4, when the resonator body 100 has the rectangular cross section, the blocking unit 300 may have the corresponding cross section with one side open. The one side of the blocking unit 300 may be open toward the inside of the wireless power receiving device 10. For example, the blocking unit 300 may be a plate having a flattened-U-shape cross section. The open side of the flattened-U-shape cross section may be directed to an inner center of the resonator body 100 having the loop structure.

The blocking unit 300 may be made of a metallic material. The blocking unit 300 may be implemented by a metal plate. A metal surface of the blocking unit 300 may prevent the resonator body 100 from being affected by a change in a surrounding medium of the wireless power receiving device 10.

A width 310 of the blocking unit 300 extends from an outermost portion of the blocking unit 300 toward the resonator body 100. The blocking unit 300 may have a length that minimizes a change in the power transmission efficiency according to the surrounding medium of the wireless power receiving device 10.

Referring to FIG. 4, the width 310 of the blocking unit 300 may be disposed around an upper portion and a lower portion of the resonator body 100 and may be extended toward an inside of the wireless power receiving device 10 from the outermost portion of the blocking unit 300. The width 310 may be selected based on a distance between the blocking unit 300 and the resonator body 100 so that the change in the power transmission efficiency according to the surrounding medium is minimized.

In addition, the width 310 of the blocking unit 300 may be varied. For example, the width 310 may be implemented by an extendible and contractible plate so that a length may be changed by an external force or a micro current. In another example, a plurality of widths 310 in different lengths may be separably attached to the blocking unit 300. The length of the variable width 310 of the blocking unit 300 may be controlled in consideration of the distance between the blocking unit 300 and the resonator body 100 so that the change in the power transmission efficiency according to the surrounding medium is minimized.

The blocking unit 300 may include a capacitor. The capacitor may be controlled to minimize the change in the power transmission efficiency according to the surrounding medium.

Thus, parameters for minimizing the change in the power transmission efficiency according to the surrounding medium may include the length and the width 310 of the blocking unit 300, the distance between the blocking unit 300 and the resonator body 100, and the capacitor of the blocking unit 300.

The blocking unit 300 surrounds the outside of the resonator body 100, the resonator body 100 and the blocking unit 300 may be separated from each other by a space unit 200. The space unit 200 may be formed between the resonator body 100 and the blocking unit 300. In another example, the blocking unit 300 may be disposed next to the resonator body 100 without any space in between. In this case, no dedicated component may be interposed between the resonator body 100 and the blocking unit 300.

The space unit 200 may maintain a constant distance between the resonator body 100 and the blocking unit 300. The space unit 200 may be composed of a dielectric material such as, for example, fire retardant composition 4 (FR4). The FR4 may fix the resonator body 100 and the blocking unit 300 so that the resonator body 100 and the blocking unit 300 may be separated by a constant distance. Any other dielectric material other than the FR4 may be provided for the space unit 200.

Figure 5:
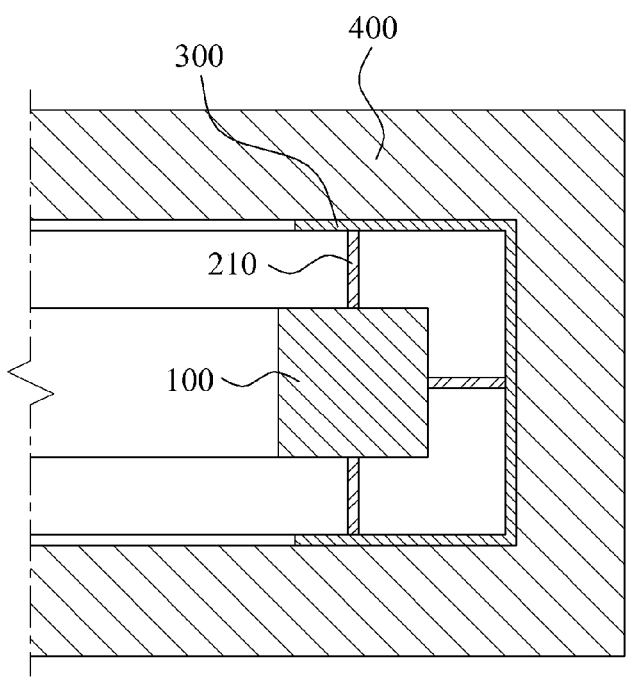
FIG. 5 is a diagram illustrating an example of a supporting medium attached to a space unit of the wireless power receiving device.

FIG. 5 is a diagram illustrating an example of a supporting medium 210 provided in the space unit 200 of the wireless power receiving device 10. Referring to FIG. 5, any component may not be provided to the space unit 200. As shown in FIG. 5, the supporting medium 210 may be provided to maintain the constant distance between the resonator body 100 and the blocking unit 300. One end of the supporting medium 210 may support the resonator body 100 while an opposite end supports the blocking unit 300. A plurality of the supporting mediums 210 may be provided to stably fix relative distances between the resonator body 100 and the blocking unit 300. For example, the plurality of supporting mediums 210 may be disposed at an upper surface, a lower surface, and a left side surface of the resonator body 100.

The supporting medium 210 may be in the form of a screw with a thread. The blocking unit 300 may include a hole for the screw to pass through. An end of the screw that has passed through the hole of the blocking unit 300 may come into contact with the resonator body 100 and stably support the resonator body 100. The thread of the screw may be screwed into the hole of the blocking unit 300, thus stably supporting the blocking unit 300.

The wireless power receiving device 10 may further include a holder 400. The holder 400 may accommodate the resonator body 100, the space unit 200, and the blocking unit 300. The holder 400 may be made of dielectric material, such as, for example, RF4 and the holder 400 may stably accommodate the resonator body 100, the space unit 200, and the blocking unit 300.

Since the blocking unit 300 is an outer conductor that surrounds the resonator body 100 that is an inner conductor, a parasitic capacitance component is generated between the blocking unit 300 and the resonator body 100. An energy stored in an inductance used for power transmission may be reduced by an energy stored in the parasitic capacitance component, thereby reducing the power transmission efficiency. However, since an H-field is concentrated on an inside of a coil, the change of characteristics may not be great with respect to the change in the surrounding medium. As a result, the efficiency change by a movement of an animal or human and a change in surroundings may be minimized and the efficiency may be maintained. If the blocking unit 300 is not provided, an inductance component and an input impedance of the H-field may be changed according to the change in surroundings of the coil. Therefore, the change in the transmission efficiency according to the surrounding medium may be greater.

Figure 6:
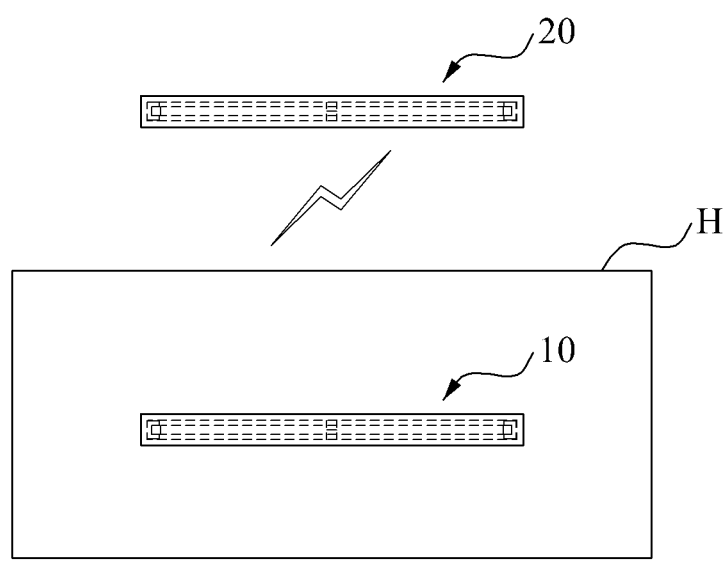
FIG. 6 is a diagram illustrating an example of a wireless power transmission apparatus.

FIG. 6 is a diagram illustrating an example of a wireless power transmission apparatus. Referring to FIG. 6, the wireless power transmission apparatus may include a wireless power receiver implanted in a subject H and a wireless power transmitter disposed outside the subject H. The wireless power transmission apparatus may be applied to a medical field and may enable power supply to an implanted medical equipment through the wireless power receiver 10 and the wireless power transmitter 20. Consequently, periodic operations for replacement of a battery may be reduced or eliminated.

The wireless power receiver of the wireless power transmission apparatus may include a resonator body that emits an electromagnetic field and a metal surface surrounding an outside of the resonator body. The metal surface may be disposed between the resonator body and a tissue of the subject H. Therefore, the metal surface may function as a blocking unit that prevents the resonator body from being affected by a change of surroundings caused, for example, by contraction or relaxation of a muscle of the subject's tissue.

The wireless power receiver may include the wireless power receiving device 10. The wireless power receiver may include the resonator body emitting the electromagnetic field, and the metal surface surrounding at least a part of the outside of the resonator body and disposed between the resonator body and the subject's tissue.

The resonator body may have a loop structure. The metal surface may have a cross section corresponding to a cross section of the resonator body. At least one side of the metal surface may be open.

A width of the metal surface, extending from an outermost portion of the metal surface to the resonator body, a distance between the metal surface and the resonator body, and a capacitor disposed in the metal surface may be selected to minimize a change in the power transmission efficiency during relaxation and contraction of the tissue.

A space between the resonator body and the metal surface may be filled with FR4. In another example, a supporting medium for maintaining uniform spacing between the resonator body and the metal surface may be included. The supporting medium may contact the resonator body with one end and contact the metal surface with another end. Any other dielectric material other than the FR4 may be provided in the space unit 200 without departing from the scope of the present disclosure.

The wireless power transmitter 20 may also include a metal surface that surrounds the outside of the resonator body as a blocking unit.

The wireless power receiving device 10 of the wireless power transmission apparatus uses magnetic resonance method, and the resonator body has a relatively high Q-factor, which is a parameter of the magnetic resonance method. Resonance frequency is sensitive to the change in surroundings. Mismatching of the resonance frequency between a wireless power transmission device 20 and the wireless power receiving device 10 may cause reduction in the transmission efficiency. Even when the environment of the wireless power transmission changes, the metal surface, which is relatively insensitive to the change in surroundings may help maintain uniform wireless power transmission efficiency and stable power supply. In case of the implanted medical device, a periodical surrounding change due to contraction and relaxation of a muscle may disturb wireless power transmission. The metal surface as the blocking unit may prevent the surrounding change from affecting the resonator body.

In a single loop resonator without the metal surface functioning as the blocking unit, effective permittivity of the resonator may change due to a change in permittivity and conductivity of a surrounding medium. Therefore, resonance frequency shift may be generated, which may reduce the wireless power transmission efficiency. Since the wireless power transmission apparatus is provided with the metal surface as the blocking unit surrounding the outside of the resonator body, a shielding effect may be obtained and therefore a change in the effective permittivity of a resonator coil may be minimized. Accordingly, the resonance frequency shift caused when the metal surface is absent may be minimized. For example, in the implant type medical equipment in which the change in surrounding is frequent, the wireless power transmission apparatus according to the embodiment may be useful to maintain uniform transmission efficiency.

Figure 8A:
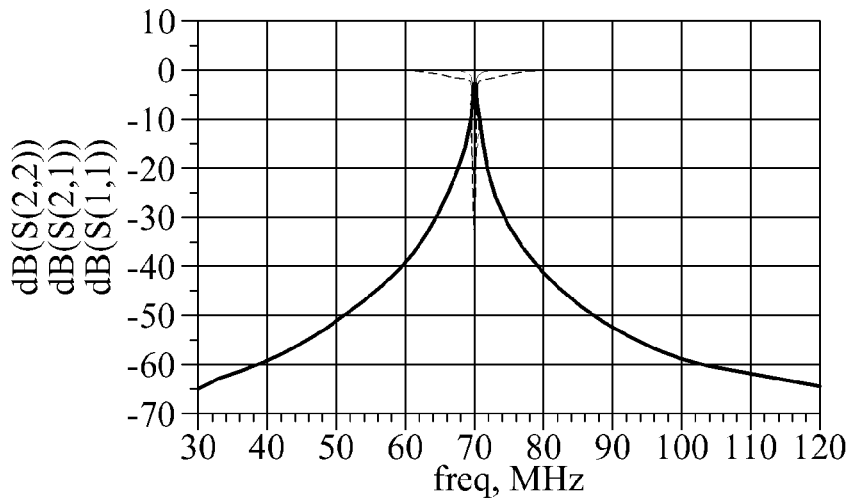
FIGS. 8A and 8B are diagrams illustrating examples of wireless power transmission efficiency with respect to relaxation and contraction of a muscle when a blocking unit is not provided with a wireless power transmission apparatus.
Figure 8B:
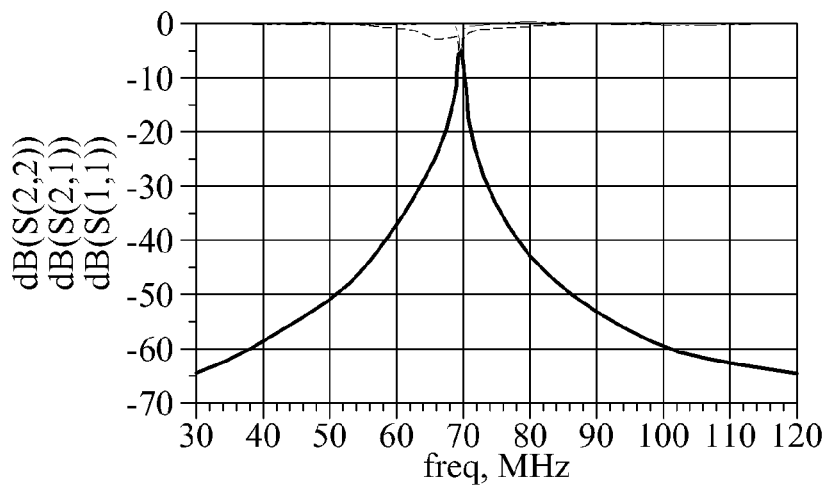
Figure 9:
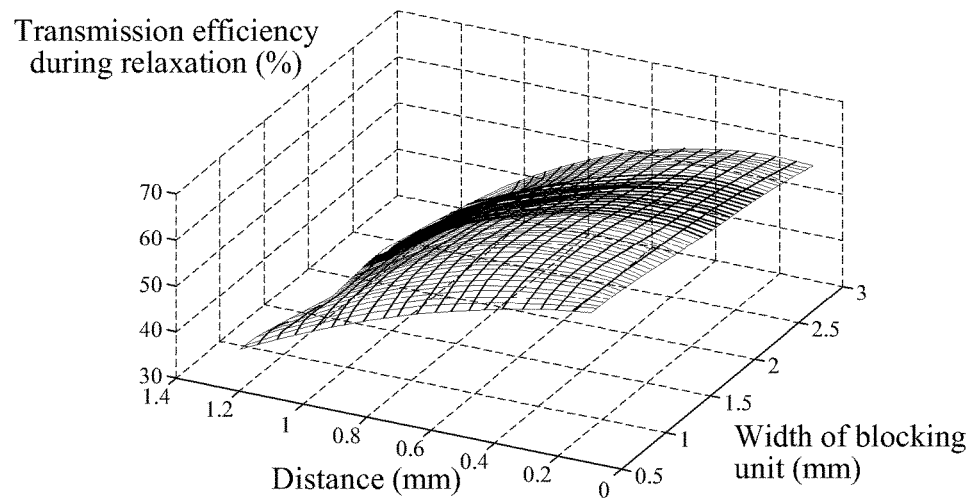
FIG. 9 is a diagram illustrating an example of power transmission efficiency of a wireless power transmission apparatus during relaxation of a muscle.
Figure 10:
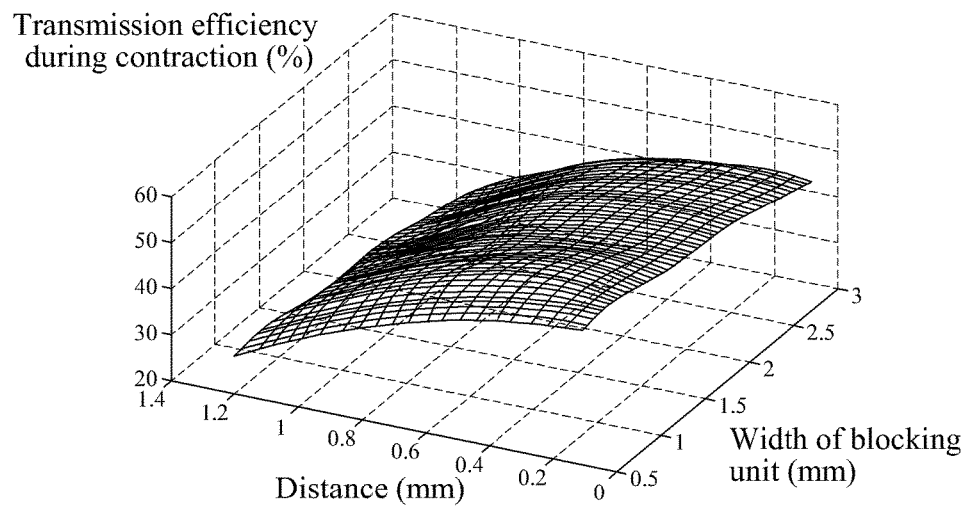
FIG. 10 is a diagram illustrating an example of power transmission efficiency of a wireless power transmission apparatus during contraction of a muscle.
Figure 11:
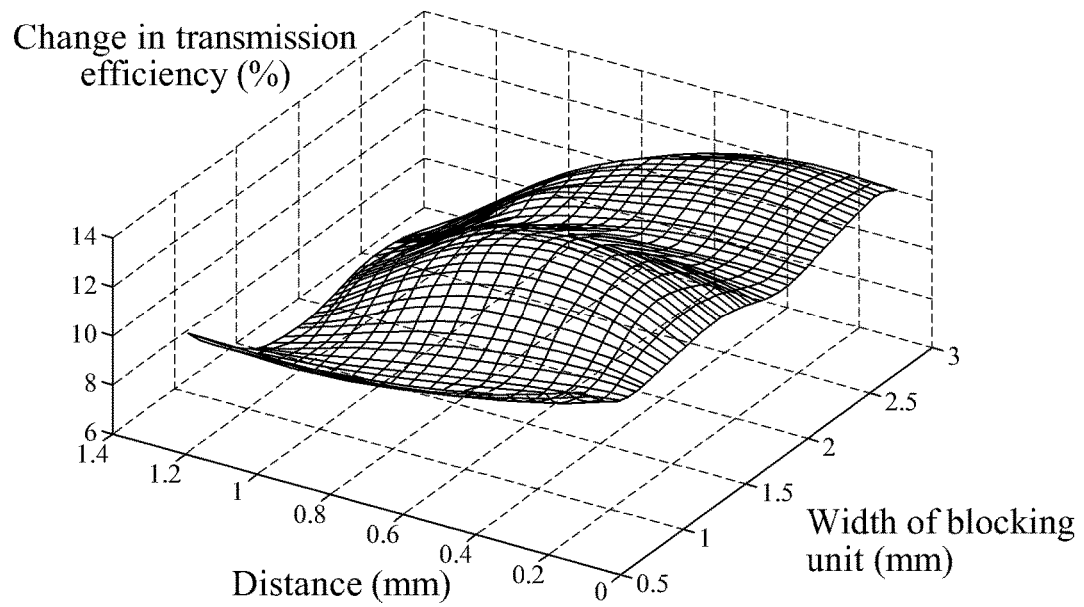
FIG. 11 is a diagram illustrating an example of variation of power transmission efficiency of a wireless power transmission apparatus.

FIGS. 7A to 7D are diagrams illustrating examples of distribution and approximate values of complex permittivity when the muscle relaxes and contracts. FIGS. 8A and 8B are diagrams illustrating examples of wireless power transmission efficiency with respect to relaxation and contraction of a muscle when a blocking unit is not provided with a wireless power transmission apparatus. FIG. 9 is a diagram illustrating an example of transmission efficiency of a wireless power transmission apparatus during relaxation of a muscle. FIG. 10 is a diagram illustrating an example of transmission efficiency of a wireless power transmission apparatus during contraction of a muscle. FIG. 11 is a diagram illustrating variation of power transmission efficiency of an example of a wireless power transmission apparatus.

Referring to FIG. 7, the complex permittivity of a human tissue due to a movement of the human body, such as contraction and relaxation of the muscle, is measured. Here, the wireless power transmission apparatus is not provided. To reduce a measurement error, the complex permittivity is measured during relaxation and contraction of the muscle of an arm placed on a height-adjustable rest. To reduce the measurement error, averaging approximation is applied with respect to a result of measuring the complex permittivity several times.

Figure 7A:
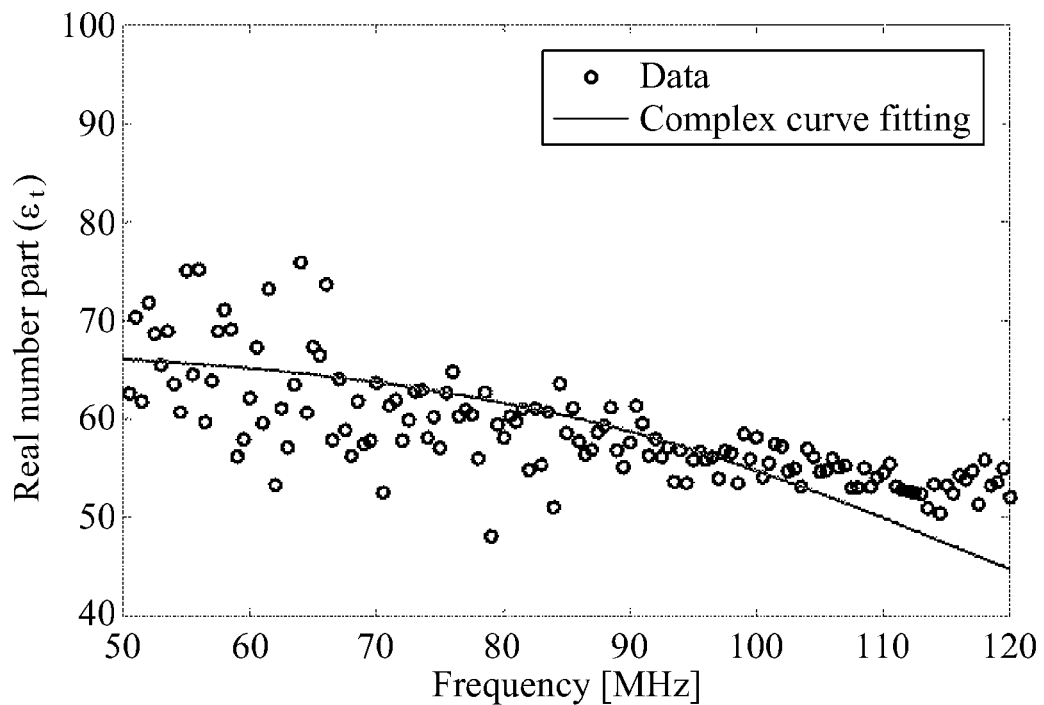
FIGS. 7A to 7D are diagrams illustrating examples of distribution of permittivity of a real number part and an imaginary number part of a muscle when the muscle relaxes and contracts.
Figure 7B:
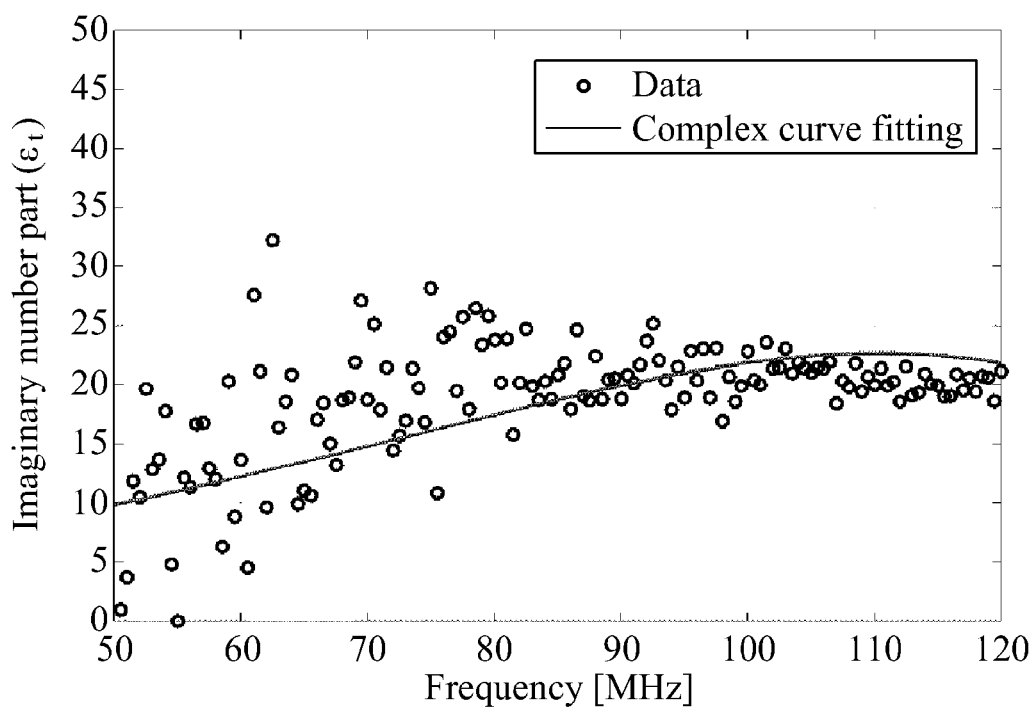
Figure 7C:
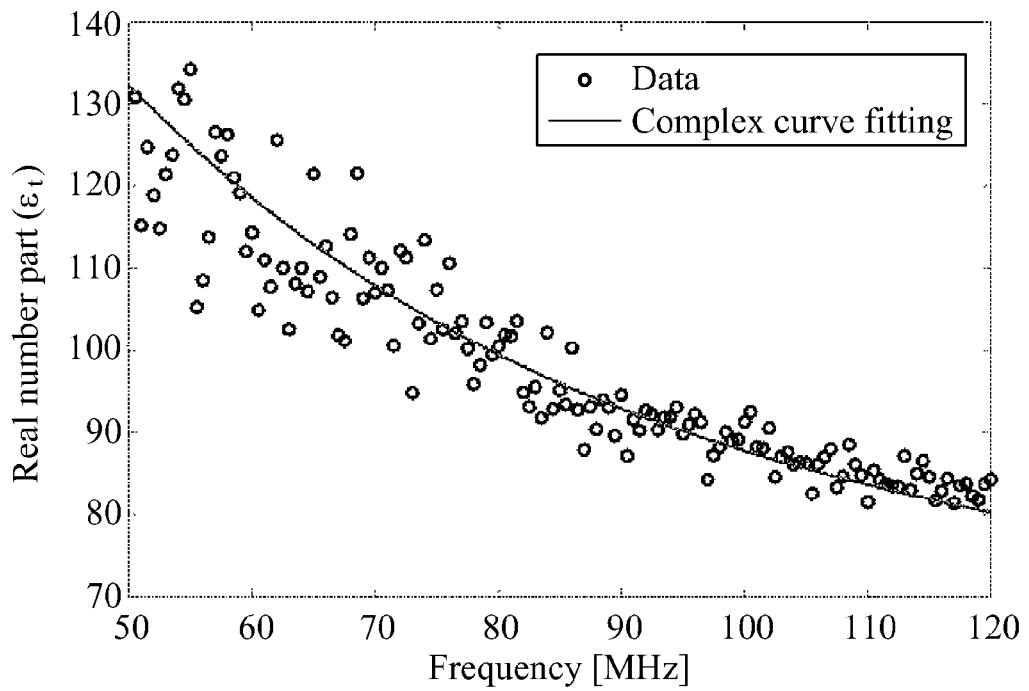
Figure 7D:
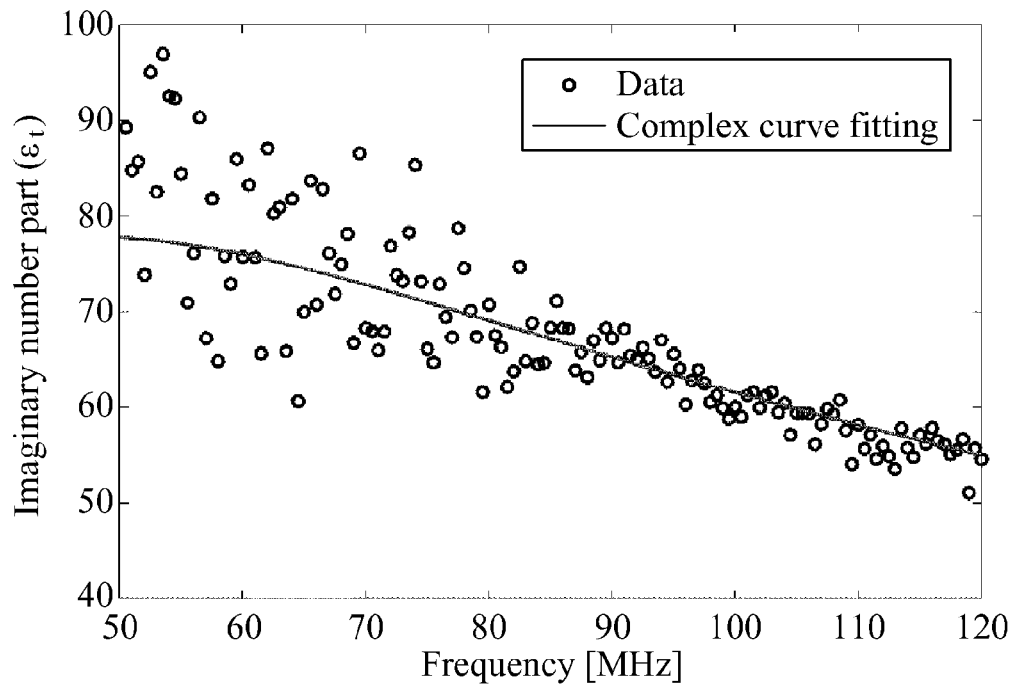

FIG. 7A is a distribution chart of permittivity of a real number part of a relaxed muscle. FIG. 7B is a distribution chart of permittivity of an imaginary number part of a relaxed muscle. FIG. 7C is a distribution chart of permittivity of a real number part of a contracted muscle. FIG. 7D is a distribution chart of permittivity of an imaginary number part of a contracted muscle.

Distribution of the complex permittivity measured during relaxation and contraction of the muscle and an approximate value extracted from the measurement result are shown. As shown in Table 1, distribution characteristics of the complex permittivity of the muscle is changed according to the frequency is expressed by a quadratic complex fractional function equation through complex curve fitting.

TABLE 1

$$\varepsilon_r(\omega) = \frac{A_0 + A_1(j\omega) + A_2(j\omega)^2}{1 + B_1(j\omega) + B_2(j\omega)^2}$$

| Relaxation of muscle | Contraction of muscle |
| --- | --- |
| A0 = 1.330707560214231e−18 | A0 = 2.131048533249984e+02 |
| A1 = −3.541531152087684e−08 | A1 = −1.751036537796149e−07 |
| A2 = 7.203565706797705e−17 | A2 = −3.019519110410122e−17 |
| B1 = −9.472942850597761e−10 | B1 = −3.253736049134561e−09 |
| B2 = 1.330707560214231e−18 | B2 = −3.259343061864698e−19 |

As shown in FIGS. 7A to 7D, the permittivity is changed according to relaxation and contraction of the muscle. Such a change in the permittivity of the surrounding medium may change the effective permittivity of the resonator, thereby causing the resonance frequency shift.

FIGS. 8A and 8B illustrate simulation results of using a wireless power transmission apparatus without the metal surface as the blocking unit, which is different from the examples of a wireless power transmission apparatus described above. Referring to FIG. 8, the transmission efficiency is approximately 85% when the muscle relaxes. Due to a change in the surroundings by contraction of the muscle, the efficiency is reduced by approximately 63%, to approximately 22%.

FIG. 9 shows optimized transmission efficiency when the muscle is relaxed using the wireless power transmission apparatus described above. The optimized transmission efficiency is changed to approximately 50% to 62% according to a distance between the resonator body and the blocking unit and a change in width of the blocking unit.

FIG. 10 shows transmission efficiency of when the muscle is contracted using the example of a wireless power transmission apparatus described above. The transmission efficiency is reduced to approximately 23% to 52%.

Referring to FIG. 11, a change range of the transmission efficiency using the wireless power transmission apparatus described above is approximately 7.8% to 12%. Considering that the transmission efficiency change of the wireless power transmission apparatus without the metal surface is approximately 22% to 85%, the blocking unit of the wireless power transmission apparatus is effective in maintaining the transmission efficiency even when the surroundings change due to the muscle movement.

Figure 12:
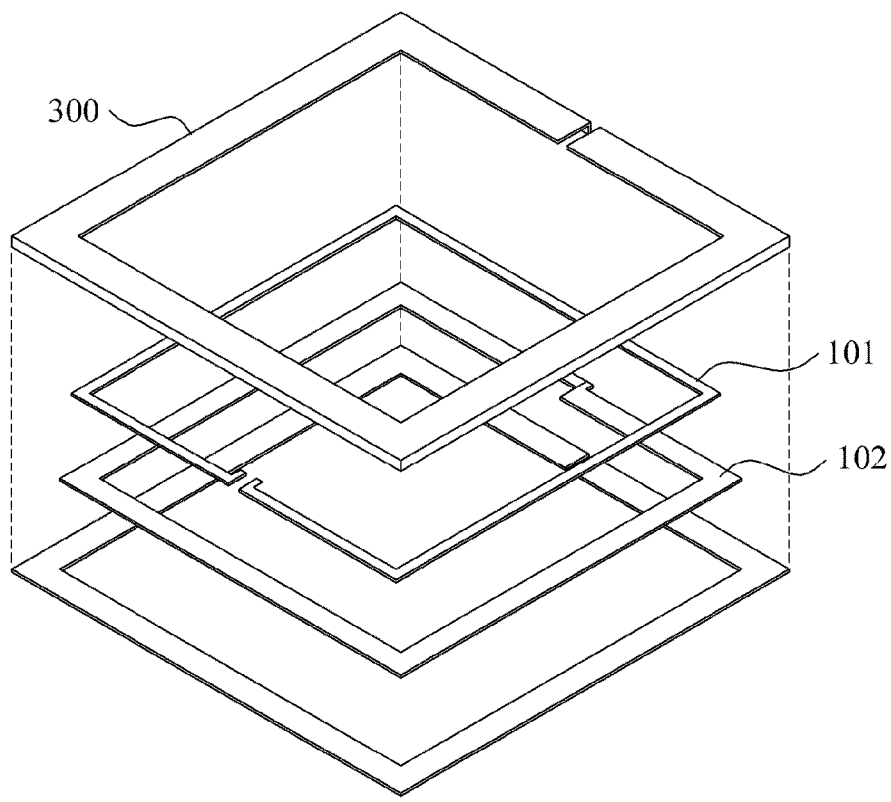
FIG. 12 is a diagram illustrating an example of a modified version of a wireless power transmission device.

FIG. 12 is a diagram illustrating an example of a modified version of a wireless power transmission device. A resonator body of the modified wireless power transmission device may include a first conductor 101 and a second conductor 102. The first conductor 101 and the second conductor 102 may have a loop structure. The first conductor 101 and the second conductor 102 may be disposed on a same plane and configured as a split ring resonator (SRR) structure in which the second conductor 102 surrounds an outside of the first conductor 101. A blocking unit 300 surrounds the first conductor 101 and the second conductor 102. A cross section of the blocking unit 300 may correspond to cross sections of the first conductor 101 and the second conductor 102. One side of the cross section of the blocking unit 300 may be open toward an inside of the first conductor 101 and the second conductor 102. Using the first conductor 101 and the second conductor 102, a resonator may be designed to have a relatively high Q-factor in a small space.

Figure 13A:
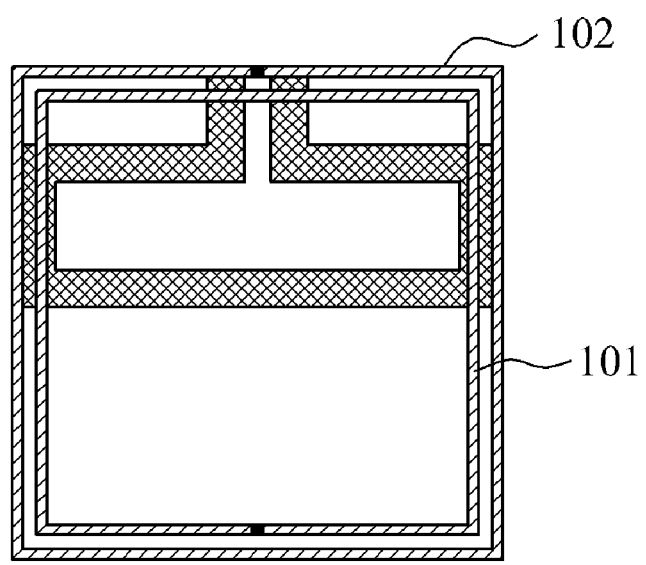
FIGS. 13A to 13C are diagrams illustrating examples of modified versions of a resonator body of a wireless power transmission device.
Figure 13B:
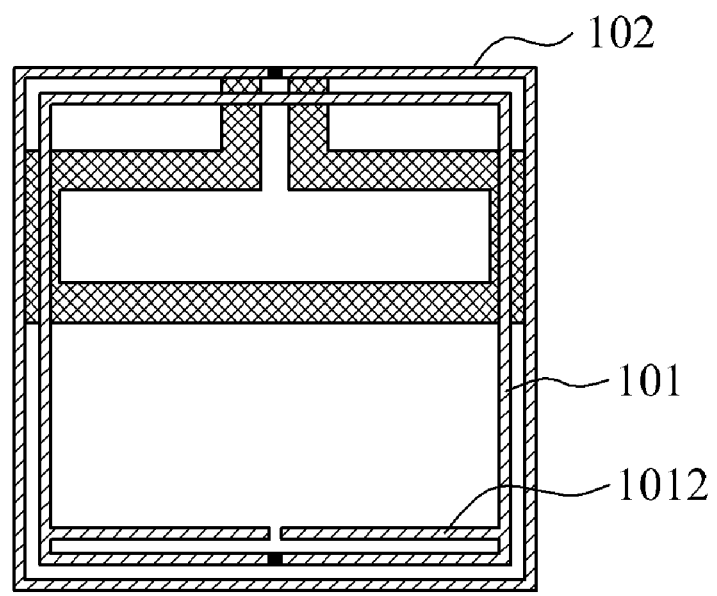
Figure 13C:
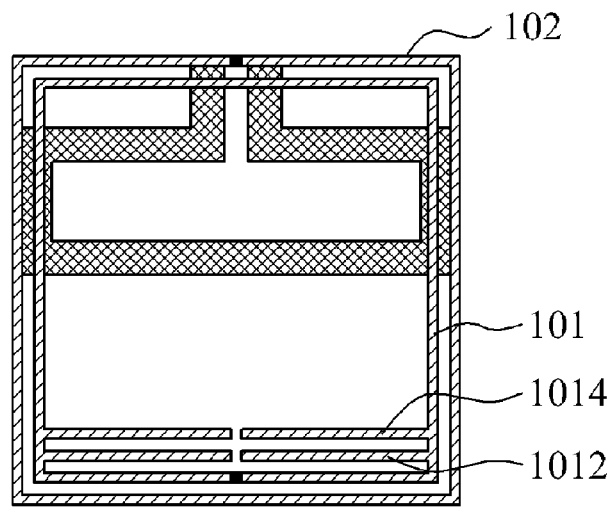

FIGS. 13A to 13C are diagrams illustrating examples of modified configurations of a resonator body of the wireless power transmission device. FIG. 13A shows a resonator body including the first conductor 101 and the second conductor 102. The first conductor 101 includes one branch.

FIG. 13B shows a resonator body in which the first conductor 101 includes two branches by including an additional branch 1012. FIG. 13C shows a resonator body in which the first conductor 101 includes three branches by including additional branches 1012 and 1014. The additional branches 1012 and 1014 may be connected to the sides of the loop structure of the first conductor 101. Therefore, the resonator body may have a nested-SRR structure.

Figure 14:
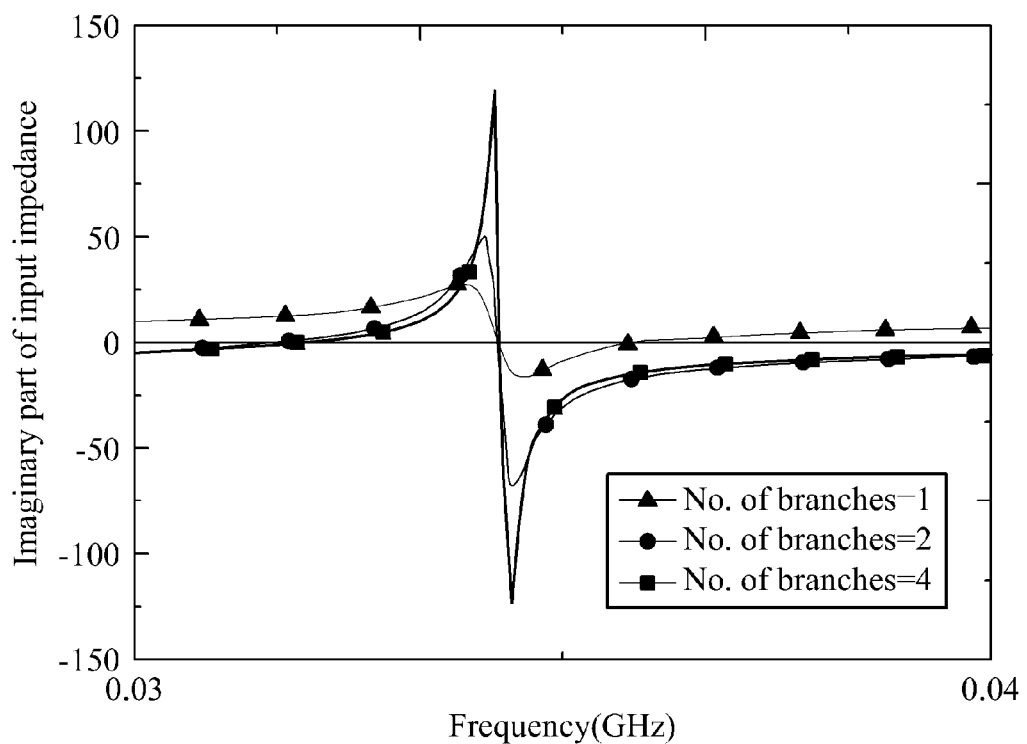
FIG. 14 is a distribution chart illustrating an example of an imaginary number part of an input impedance according to a number of branches of the resonator body for a modified version of a wireless power transmission device.

FIG. 14 illustrates distribution of an imaginary part of an input impedance of a resonator body according to frequency as a number of branches increases in the resonator body of the modified version. In the graph of FIG. 14, a great increase of the imaginary part of an input impedance implies an increase in a Q-factor of the resonator body. Due to a limited implantation space for an implant type equipment inserted in a human body, the resonator body is needed to have a high Q-factor in a small size. The high Q-factor may be obtained by configuring the resonator body in the nested-SRR structure. Referring to FIG. 14, the Q-factor is increased by increasing the number of branches. The Q-factor is approximately 103.4 when four branches are provided, which is an increase of approximately 20% from the Q-factor of approximately 80.8 when one branch is provided.

Figure 15:
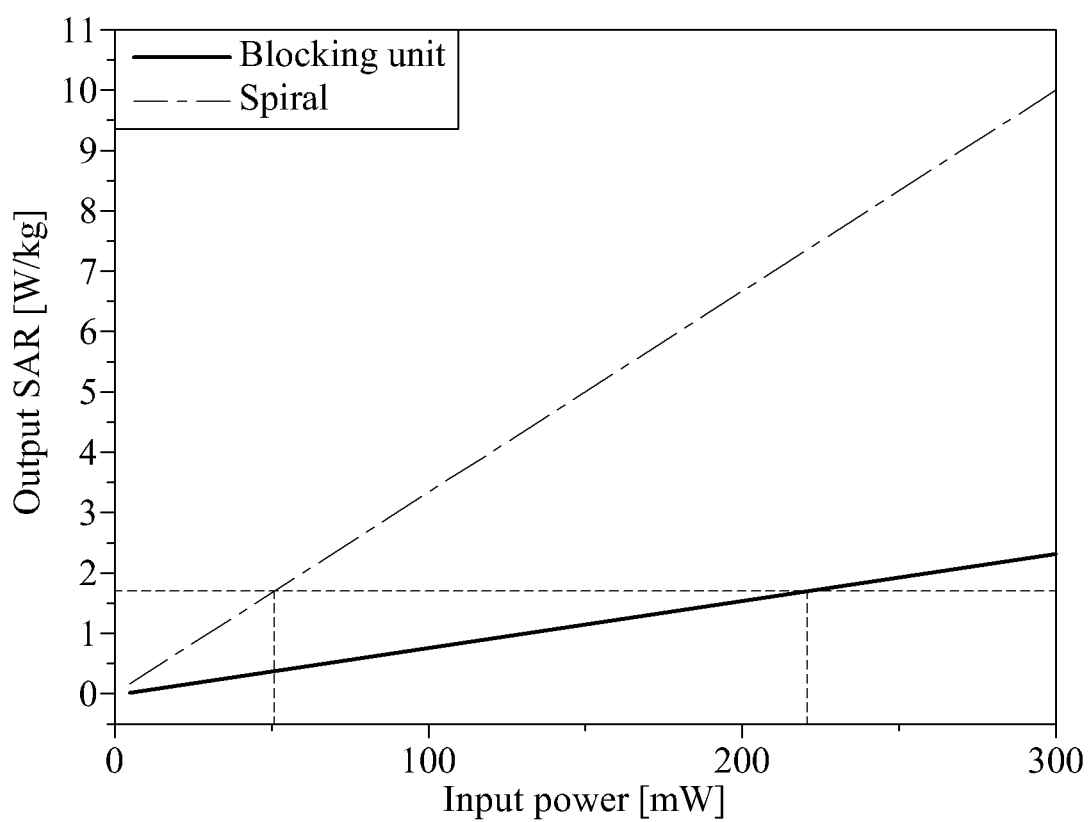
FIG. 15 is a diagram illustrating an example of a specific absorption rate (SAR) of a modified version of a wireless power transmission device.

FIG. 15 is a graph illustrating an example of specific absorption rates (SAR) of the modified version of the wireless power transmission device and of a spiral resonator without a blocking unit. As shown in FIG. 15, the SAR of the modified version of the wireless power transmission device is reduced to approximately a quarter of the SAR of the spiral resonator that is not provided with the blocking unit.

According to the example of a wireless power transmission apparatus described above, a resonator not affected by a surrounding medium may be implemented. Using the resonator, power transmission may be stably performed even when transmission environment suddenly changes. Accordingly, reduction in power transmission efficiency due to sudden change in surrounding may be prevented. For example, when a pacemaker performs wireless power transmission, a change in the transmission efficiency caused by contraction and relaxation of a pectoralis major muscle may be prevented. As another example, in case of a medical equipment that travels in a human body, such as a capsule type endoscope, the change in the transmission efficiency caused by a position change of the equipment may be prevented. As yet another example, when a coolant is used to reduce a temperature change during wireless power transmission, the change in the transmission efficiency caused by a movement of a fluid may be prevented.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power receiver comprising:
a resonator configured to emit an electromagnetic field;
a blocker configured to surround a portion of an exterior of the resonator; and
a spacer disposed between the resonator and the blocker,
wherein the resonator is in a loop shape and the blocker surrounds an outside of the resonator, the blocker has a cross section corresponding to a cross section of the resonator, and at least one side of the blocker is open and directs to an inner center of the resonator in the loop shape, and wherein the spacer comprises a supporting medium configured to maintain a distance between the resonator and the blocker, and the supporting medium is a screw contacting the resonator at a first end and passing through the blocker at a second end.

2. The wireless power receiver of claim 1, wherein at least a part of the blocker is made of metal.

3. The wireless power receiver of claim 1, wherein a change in transmission efficiency of the resonator is minimized based on at least one of a width of the blocker extended from an outermost portion of the blocker to the resonator, a distance between the resonator and the blocker, or a capacitor disposed in the blocker.

4. The wireless power receiver of claim 1, wherein a width of the blocker extending from an outermost portion of the blocker toward the resonator is variable.

5. The wireless power receiver of claim 1, wherein the blocker comprises a slot for leakage of the electromagnetic field from the resonator.

6. The wireless power receiver of claim 1, wherein the resonator comprises a transmission line and a capacitor.

7. The wireless power receiver of claim 1, wherein a magnetic core is configured to pass through the resonator.

8. The wireless power receiver of claim 1, wherein the spacer is filled with a fire retardant composition 4 (FR4).

9. The wireless power receiver of claim 1, further comprising:
a holder configured to contain the wireless power receiver.

10. The wireless power receiver of claim 1, wherein the blocker is a plate having a flattened-U-shape cross section of which an open side directs to the inner center of the resonator in the loop shape.

11. The wireless power receiver of claim 1, wherein the open side of the blocker is in the form of a slot formed in a length direction of the blocker.

12. A wireless power receiver comprising:
a resonator having a loop shape; and
a metal surface surrounding an exterior of the resonator and being disposed between the resonator and a surrounding medium, and a slot in the metal surface being configured to leak an electromagnetic field from the resonator; and
a spacer disposed between the resonator and the metal surface,
wherein the metal surface surrounds an outside of the resonator, a cross section of the metal surface corresponds to a cross section of the resonator, and a side of the metal surface in which the slot is formed directs to an inner center of the resonator in the loop shape, and
wherein the spacer comprises a supporting medium configured to maintain a distance between the resonator and the metal surface, and the supporting medium is a screw contacting the resonator at a first end and passing through the metal surface at a second end.

13. The wireless power receiver of claim 12, wherein a change in transmission efficiency of the resonator due to disturbance in a surrounding medium is minimized based on at least one of a width of the metal surface that extends from an outermost portion of the metal surface to the resonator, a distance between the resonator and the metal surface, or a capacitor disposed in the metal surface.

14. The wireless power receiver of claim 12, wherein the resonator comprises:
   a first conductor having a loop structure; and
   a second conductor disposed on a same plane as the first conductor to surround an outside of the first conductor, and a distance separating the first conductor from the second conductor.

15. The wireless power receiver of claim 14, wherein the first conductor comprises a first branch element extending from a first side of the loop structure to a second side of the loop structure.

16. The wireless power receiver of claim 15, wherein the first conductor comprises a second branch element extending from the first side of the loop structure to the second side of the loop structure.

17. A wireless power transmission apparatus comprising:
   a wireless power transmitter disposed outside a subject; and
   a wireless power receiver implanted in the subject, wherein the wireless power receiver comprises:
      a resonator configured to emit an electromagnetic fields,
      a metal surface surrounding a portion of an exterior of the resonator and being disposed between the resonator and a tissue of the subject, and
      a spacer disposed between the resonator and the metal surface,
   wherein the metal surface surrounds an outside of the resonator, the metal surface has a cross section corresponding to a cross section of the resonator, and at least one side of the metal surface is open and directs to an inner center of the resonator in the loop shape, and
   wherein the spacer comprises a supporting medium configured to maintain a distance between the resonator and the metal surface, and the supporting medium is a screw contacting the resonator at a first end and passing through the metal surface at a second end.

18. The wireless power transmitter of claim 17, wherein a change in transmission efficiency due to movement of the tissue is minimized based on at least one of a width of the metal surface that extends from the outermost portion of the metal surface to the resonator, a distance between the resonator and the metal surface, or a capacitor disposed in the metal surface.

* * * * *